May 5, 1964     J. M. CRAIGO ETAL     3,131,475
INSTRUMENT FOR ORIENTING THE PLANES OF OCCLUSION
Filed Aug. 6, 1962
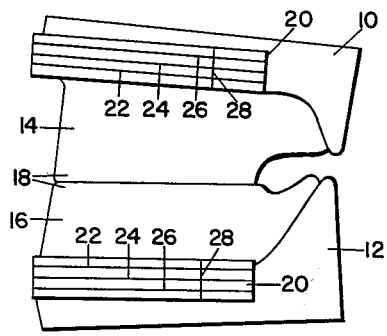
_Fig. 1._
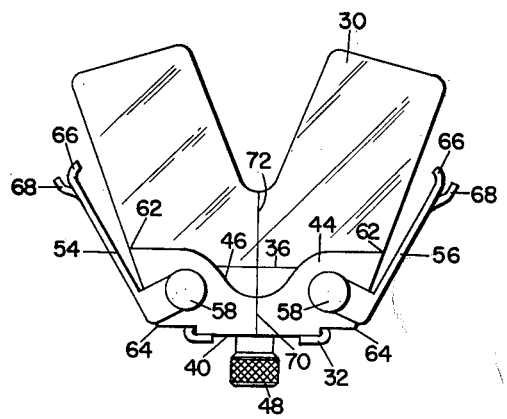
_Fig. 2._
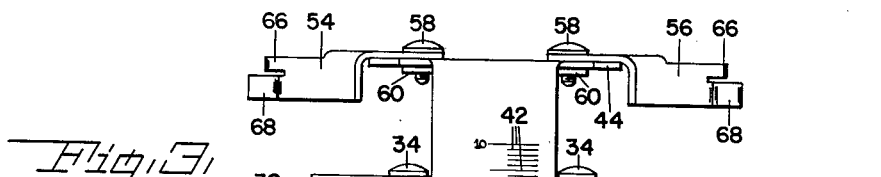
_Fig. 3._     _Fig. 5._
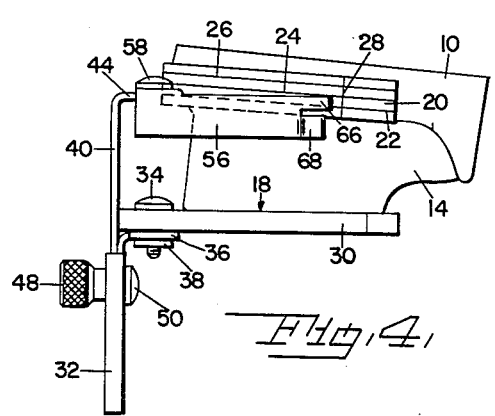
_Fig. 4._
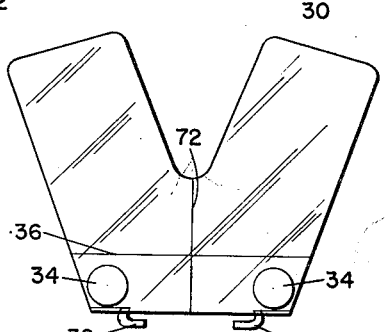
INVENTORS.
JOHN M. CRAIGO
HELEN E. CRAIGO
BY Kenwood Ross
ATTORNEY.

United States Patent Office 3,131,475
Patented May 5, 1964

3,131,475
INSTRUMENT FOR ORIENTING THE PLANES OF OCCLUSION
John M. Craigo and Helen E. Craigo, both of 6 Southwood Road, Thompsonville, Conn.
Filed Aug. 6, 1962, Ser. No. 215,138
6 Claims. (Cl. 32—19)

Our invention relates to a method of and means for orienting the planes of occlusion in the making of the upper and lower bite blocks for artificial dentures so as to ensure an accurate occlusion when the teeth are made ready for use by the patient.

It is well known that, in dental restorations, the fundamental desideratum sought by the dental practitioner is balanced occlusion to simulate the normal condition as found in a natural dentition. By "balanced occlusion" is meant a contact between the occlusal surface of the upper and lower sets of teeth in any position of the lower jaw in relation to the upper jaw in centric and in eccentric lateral positions. Only when there is a balanced occlusion is a similitude of the normal physiological functions of the human dental apparatus possibly attainable. In this invention, such as precisely what is made achievable by a simple, easy and accurate procedure and means so that by the placement of the dentures in their proper horizontal and vertical planes, when they are brought into contacting relation in the mouth of an edentulous person, proper occlusion is attained.

One of the difficulties, in the making of properly functioning artificial dentures, has been in the lack of adequate mechanical facilities to aid the dentist in finding and recording the occlusal plane or planes wherefore the dentist can accurately arrange the artificial teeth in balanced occlusion in relation to the patient's condylar inclination.

Heretofore, the principal means available for translating the condylar inclination to the occlusal planes of the upper and lower artificial dentures has resided entirely in the skill of the individual dentist or dental technician. In artificial dentures so produced, the occlusal surfaces of the upper and lower teeth frequently do not balance, requiring recourse to excessive teeth grinding, with its resultant flattening of the biting surfaces, thereby greatly impairing, if not destroying, their function.

This invention offers positive means for orienting the planes of occlusion so as to enable the dentist or technician to set the teeth in the upper and/or lower denture plates on the precise occlusal plane corresponding to that of the patient's condylar inclination.

As is known, in constructing artificial dentures, casts or models are first made from the upper and/or lower impressions. The upper and/or lower base plates having occlusal rims of deformable wax-like material are then made and are attached to the casts. In order to set the artificial teeth in the rims of the base plates so that their cusps will properly mesh with one another and function in harmony with the movements of the patient's jaws, it is normal to mount the casts and integral base plates and rims in a mechanical articulator which simulates the movements of the patient's jaw. They must be mounted in a relationship which is identical to the relationship that the lower and/or upper base plates will have to the rotational centers of a patient's jaws when the finished dentures are mounted on said jaws in his mouth.

By the means and method of this invention, the casts or models are accurately oriented as to the planes of occlusion by means of predetermined anterior and posterior, upper and lower, vertical dimensions.

Broadly speaking, the invention envisions the orientation of the planes of occlusion on the upper and/or lower bite blocks. The upper or lower casts, or both, are first surveyed to permit indication, on the anterior and posterior portions thereof, the medium line and the horizontal lines representing the mucco labial fold on each side thereof.

The device of the invention is then brought into employment in manner so that its gauge means may be set relative to its occlusal plate, according to the said predetermined anterior and posterior vertical dimensions. The cast and its base plate may then be placed on the device, with the soft wax occlusal rim resting upon the occlusal plate. By pressing downwardly upon the cast, the wax rim is deformed until the gauge means associated with the occlusal plate are in horizontal alignment with the said predetermined medium line and horizontal lines on the cast.

As a novel feature of the invention, the said occlusal plate will be formed from a transparent material in the nature of clear plastic or the like, wherefore the dentist or technician will be afforded an unrestricted view of the soft wax occlusal rim from any desired angle, thus enabling him to maintain a close check on all operations as said rim is deformed.

As still another feature worthy of particular notice, the device of the invention is provided with novel inboard and outboard stop portions integral with the anterior alignment guide means thereof, wherefore movement of the posterior aligning arms means may be closely regulated.

It is an object of the present invention to provide an improved method and apparatus wherein most of the work of securing an accurate occlusion is performed exteriorly of the patient's mouth.

This invention will be best understood from a consideration of the following detailed description in the light of the accompanying drawing forming a part of the specification.

It will be understood, however, that the invention is not to be confined to the specific disclosure herein, the invention being susceptible of such changes and modifications as define no material departure from the salient features of the invention as expressed in the below appended claims.

In the drawing:

FIG. 1 is a side elevational view of a pair of base plates having wax occlusal rims secured thereto, same showing the relative positions of the bite blocks after the wax occlusal rims have been deformed;

FIG. 2 is a top plan view of the device of the invention;

FIG. 3 is a front elevational view of the device of the invention as shown in FIG. 2;

FIG. 4 is a side elevational view of a base plate and wax occlusal rim of an upper bite block and the device of the invention as shown in FIG. 2, the wax occlusal rim having been deformed; and FIG. 5 is a top plan view of the transparent occlusal table of the device of the invention.

In carrying out the method of this invention, a temporary denture (upper or lower) or a pair of temporary dentures (upper and lower) are first provided.

As is well known, a denture is formed in the usual way and, briefly stated, is made by the forming of an impression of the respective jaw (upper or lower or both) with a suitable material which is placed in the patient's mouth for purposes of being shaped and is capable of hardening and maintaining its shape as a mold after removal therefrom. A plastic material is poured into such formed mold and is allowed to harden so as to form the representation of the respective jaw in a resulting stone cast or model. Said stone casts or models are identified in the drawing by numeral 10 representing an upper cast and by numeral 12 representing a lower cast.

An upper base plate or bite block 14 is attached to upper cast 10, and a lower base plate or bite block 16 is attached to lower cast 12, with each base plate being pressed into position until it accurately fits the so-called negative.

The casts may be provided with raised portions (not shown) formed from plastic or the like and may be adapted for subsequent holding in an articulator, if desired. Same do not form a part of this invention so that they will not be further discussed herein.

A wax occlusam rim 18, made of a deformable wax, is applied to each of the respective upper and lower base plates or bite blocks and, in this rim, the appropriate teeth will eventually be embedded, as is well known.

As the method, up to this point, is old and well known, it is believed that this brief outline will suffice.

Herefollowing, reference will be frequently made to the anterior and posterior, upper and lower, vertical dimensions. Cognate subject matter, reciting an instrument for determining such vertical dimensions, both extraoral and intraoral, of the upper and lower dental arches of an edentulous person, is embraced in our issued Patent No. 2,902,769, dated September 8, 1959.

Each cast or model is surveyed by indicating thereon a medium line at the labial frenum and a horizontal line at the mucco labial fold at each side of the cast.

A horizontal tape or model surveying rule 20 is fixed to and embraces the anterior and posterior portions of each of the casts 10 and 12 and is disposed generally parallel to the respective upper and lower mucco-labial folds and around the periphery of the said casts.

Spaced and parallel horizontal medium lines 22, 24 and 26 are imprinted on each tape 20 and aid in establishing the correct horizontal plane around the respective cast and are subsequently used in determining the vertical dimensions of the bite block, as will hereinafter appear.

The lines 22, 24 and 26 indicate the medium at the labial frenum and at the mucco labial fold on either side thereof.

A vertical sight line 28 intersects the medium lines adjacent the rearward extremity of the tape 20 on each side of casts 10 and 12. Said sight lines, in conjunction with said medium lines, is used in orienting the planes of occlusion.

The combined cast and bite block and wax occlusal rim, with the tape 20 fixed to the cast, is then brought to the vertical dimension instrument for orienting the plane of occlusion.

The construction of the instrument per se will now be described.

The instrument of the invention will be seen to comprise a horizontally disposed supporting or occlusal table 30 upon the upper planar surface of which the combination cast and bite block and wax occlusal rim may be placed.

The table 30 will preferably, but not obligatorily, be formed from a transparent material in the nature of clear plastic glass or the like, thus offering a full view of all operations to the dentist or technician. It will, of course, be apparent that the table may be formed from metal or any other suitable material, if desired.

At the forward or anterior edge of said table 30, a vertically disposed guide 32 is provided, which guide depends downwardly from the lower surface of said table, and is fixed thereto as by screws 34 which extend through the table 30 and inturned lip 36 of the guide, and which have nuts 38 threaded thereon. The lip 36 of the guide 32 extends transversely across the entire anterior edge of table 30, as best seen in FIG. 5, thus insuring against any displacement of the guide.

Within the guide 32, a vertical anterior slide or gauge 40 is slidably receivable, same having a calibrated scale 42 delineated on the outer or forward face thereof.

Slide 40 is adapted to be movable vertically relative to table 30 and is provided at its upper extremity with a horizontally disposed alignment standard 44 which is fixed thereto in manner so as to extend transverse to the longitudinal axis thereof, as best shown in FIG. 3.

Alignment standard 44 is provided at its innermost edge with a cut-out or notch 46 to permit observation and correct positioning of the cast relative to the instrument, as will appear.

A locking thumb nut 48 is provided, and is threaded on the stem of a locking member 50 extending horizontally through an elongated slot 52 in vertical guide 32 and through a suitable opening in slide 40.

By tightening thumb nut 48, slide 40 may be fixed in position relative to guide 32 and table 30.

The alignment standard 44 is adjustable to any desired height or vertical dimension above the table 30 accordingly as slide 40 is adjusted relative to guide 32, it being remembered that table 30 is fixed to said guide. Such height or vertical dimension is determined by scale 42 which serves to measure said distance, normally in millimeters. Said distance will be predetermined by the aforementioned instrument described in our Patent No. 2,902,- 769, same not forming a part of this invention, and will be referred to as the anterior vertical dimension. Of course, there will be one such dimension in the case of an upper denture and another in the case of a lower denture.

A pair of spaced, parallel and horizontally-inwardly extending posterior aligning arms 54 and 56 are pivotally mounted as by screws 58, having nuts 60 threaded thereon, to the upper planar surface of horizontal anterior alignment standard 44, said arms being disposed above and on a plane parallel to the plane of the occlusal table 30.

The innermost and outermost side edges of alignment standard 44 will form inboard and outboard stop portions, 62 and 64 respectively, adjacent the opposite ends of said guide, which serve to limit the pivotal movement of the aligning arms 54 and 56. As best seen in FIG. 2, the stop portions 62, 62 adjacent the opposite ends of the innermost side edge of aligning standard 44 serve to limit inward or inboard movement of aligning arms 54 and 56, while stop portions 64, 64 adjacent the opposite ends of the outermost side edge of standard 44 serve to limit outward or outboard movement of aligning arms 54 and 56.

Laterally inwardly and outwardly extending fingers, 66 and 68, respectively, are provided at the ends of each of the aligning arms 54 and 56, with the inwardly extending fingers 66 of the pair aiding in obtaining a more accurate positioning of the arms relative to the tape 20, as will appear, and with the outwardly extending fingers 68 of the pair functioning as handle or gripping means whereby the arms 54 and 56 may readily be manipulated.

Posterior aligning arms 54 and 56 may be pivoted relative to alignment standard 44 so as to be swung outwardly or inwardly whereby the instrument may be suitably adjusted to accommodate casts of various sizes, it being appreciated that the occlusal table 30 and its related components are of such design and configuration as to accommodate bite blocks and casts of any dimensions.

In the orientation of the plane of occlusion for the upper bite block 10, vertical anterior slide 40 is first adjusted vertically to the predetermined upper anterior vertical dimension so as to position anterior alignment standard 44 above occlusal table 30 a distance corresponding to the predetermined vertical height desired for the anterior side of the finished bite block. The slide 40 is then locked in position by tightening the thumb screw 48.

The occlusal surface of the wax bite rim 18 is then warmed to render the wax soft; the combination cast, bite block and wax occlusal rim are then placed on and centrally of the occlusal table 30 with the outer rim of the deformable soft wax resting thereon.

The cast 10 will then be moved into abutment with the alignment standard 44, with the labial frenum of the cast being receivable in the notch 46 of the guide and being aligned with center guide lines 70 and 72 provided on standard 44 and on table 30.

The spaced posterior aligning arms 54 and 56 are then swung inwardly so that the inwardly extending fingers 66 are brought to bear against the mucco labial fold on opposite sides of the labial frenum.

So centered, cast 10 is next manually pressed downwardly upon the occlusal table. The soft wax being deformable so as to yield or become displaced, the cast may be pressed downwardly until the lowermost horizontal medium line 22 of surveying tape 20 registers horizontally with anterior alignment standard 44, and the uppermost or intermediate horizontal medium lines 26 or 24 on the tape 20 registers with the longitudinal upper edge of the inwardly extending fingers 66 of each of the arms 54 and 56 at the approximate point of intersection with the vertical sight lines 28. Such resulting position is best shown in FIG. 4 of the drawing.

Whether the uppermost or intermediate medium lines 26 or 24 respectively, are used will have been predetermined by appropriate measurements previously taken in the mouth of the patient.

Thus, the proper occlusal plane is established providing the proper vertical dimensions at the anterior and posterior sides of the bite block and the correct angle or degree of cant or divergence is thus established.

In the orientation of the plane of occlusion for the lower bite block 12, the procedure is much the same, the anterior slide 40 being adjusted to the predetermined lower anterior vertical dimension. Therefollowing, the combination cast, bite block and wax occlusal rim are placed on the occlusam plate with the soft wax facing downwardly, cast 12 is pressed downwardly until the lowermost horizontal medium line 22 of tape 20 registers horizontally with anterior alignment standard 44, and the uppermost or intermediate horizontal medium line 26 or 24 on tape 20 registers with the longitudinal upper edge of the inwardly extending fingers 66 of each of the arms 54 and 56 at the approximate point of intersection with the adjacent vertical sight line 28.

In summation, it will be observed that the invention includes a method and an apparatus for realizing said method, which method envisions the establishment of the occlusal plane relative to predetermined anterior and posterior vertical dimensions from the horizontal of the mucco labial fold of a cast and consists in, surveying a cast and indicating on the anterior and on the posterior portions thereof the horizontal of the mucco labial fold, associating with the cast a bite block having a rim of deformable wax-like material, setting gauge means above the occlusal table according to the predetermined anterior and posterior vertical dimensions, placing the cast and bite block with its wax rim on the table with the wax rim resting thereon, and pressing downwardly on the cast to deform the wax rim until the anterior and posterior indications on the cast are in horizontal register with the aligning members of the anterior gauge means and the aligning arms.

Various changes and modification may be in the form of the apparatus and method of the invention without departing from the spirit and scope thereof and therefor it is desired to be limited, if at all, by the appended claims rather than by the foregoing description of the present preferred form of the invention.

We claim:

1. A device for orienting the plane of occlusion of a cast having an associated bite block with a deformable wax occlusal rim comprising, an occlusal table for supporting the combination cast and bite block and rim and having guide means depending from its anterior edge, a calibrated labial frenum slide being slidably receivable within said guide means at the anterior edge of said occlusal table and carrying a horizontally-disposed aligning standard at its upper extremity above said occlusal table, said aligning standard having an inwardly facing extremity for positioning adjacent the cast as said labial frenum slide is adjusted to a predetermined position relative to said occlusal table according to the anterior vertical dimension for the deformation of the wax occlusal rim upon said occlusal table until the medium line of the labial frenum of the cast reaches alignment with the inwardly facing extremity of said horizontally-disposed aligning standard, a pair of spaced parallel posterior aligning arms being pivotally mounted upon said aligning standard and being movable above said occlusal table and each having an inwardly facing extremity for positioning adjacent the cast preparatory to the deformation of the wax occlusal rim upon said occlusal table until the horizontal lines of the mucco labial fold at each side of the cast reach alignment with the inwardly facing extremity of the respective posterior aligning arms of said pair thereof.

2. In the device according to claim 1 wherein said occlusal table is formed from a transparent material.

3. In the device according to claim 1 wherein said horizontally-disposed aligning standard defines inboard and outboard stop portions adapted to limit the inward and outward movement of said aligning arms.

4. A device for the orientation of the plane of occlusion of a cast having an associated bite block with a deformable wax occlusal rim comprising, a horizontally-disposed occlusal table for disposition of the combination cast and bite block and rim thereupon and being provided with guide means depending vertically from a forward edge thereof, a calibrated vertically-disposed forward slide being slidable within the said guide means of said table and being provided at its upper extremity with a horizontally-disposed alignment standard, said horizontally-disposed alignment standard having a notched innermost side edge for positioning adjacent the cast as said forward slide is adjusted to a predetermined height corresponding to the forward vertical dimension preparatory to the downward pressing of the cast on said table for the deformation of the wax occlusal rim until the predetermined horizontal of the labial frenum of the cast is alignable with the innermost side edge of said horizontally-disposed alignment standard, independent inwardly and horizontally extending rearward posterior aligning arms pivotally mounted on said alignment standard above said table and having inwardly extending fingers on the innermost ends thereof for positioning adjacent the cast, the height of the upper longitudinal edge of each of said fingers corresponding to the rearward vertical dimension, the upper longitudinal edge of each of said fingers being alignable with the predetermined horizontal of the mucco labial fold of the cast upon downward pressing of the cast on said table for the deformation of the wax occlusal rim.

5. A method for the orientation of the plane of occlusion of a cast having an associated bite block with a deformable wax occlusal rim comprising the steps of surveying the cast and indicating thereon the horizontal medium of the labial frenum and of the mucco labial fold, placing said cast with its wax rim down on an occlusal table having anterior and posterior gauge means associated therewith, setting said gauge means according to predetermined vertical dimensions pressing downwardly on the anterior portion of the cast to deform the wax rim until the horizontal medium of the labial frenum is aligned with said anterior gauge means, and pressing downwardly on the anterior portion of the cast until the horizontal medium of the mucco labial fold is aligned with said posterior gauge means.

6. A method for the orientation of the plane of occlusion of a cast having an associated bite block with a deformable wax occlusal rim comprising the steps, surveying the cast and indicating on the anterior and on the posterior portions thereof the medium and the horizontal of the labial frenum and of the mucco labial fold, setting anterior gauge means and posterior aligning arms above an occlusal table according to the predetermined anterior and posterior vertical dimensions, placing the cast and bite block on the occlusal table with the wax rim of said bite block resting thereon, and pressing downwardly on the cast to deform the wax rim until the anterior indication on the cast is in horizontal register with the anterior gauge means and until the posterior indication on the cast is in register with the posterior aligning arms.

References Cited in the file of this patent

UNITED STATES PATENTS 252,785     Manker et al. _____ Jan. 24, 1882